US 6,711,445 B1

(12) United States Patent
Heath et al.

(10) Patent No.: US 6,711,445 B1
(45) Date of Patent: Mar. 23, 2004

(54) REFRIGERATION CONTROL APPARATUS AND METHOD

(75) Inventors: Richard Heath, Phenix, AL (US); Roy M. Rader, Columbus, GA (US); Henry Robert Pellerin, Greenville, SC (US); Paul Friedlander, Owings Mills, MD (US)

(73) Assignees: Kysor/Warren, Conyers, GA (US); Danfoss Inc., Baltimore, MD (US)

( * ) Notice: Subject to any disclaimer, the term of this patent is extended or adjusted under 35 U.S.C. 154(b) by 0 days.

(21) Appl. No.: 09/302,907

(22) Filed: Apr. 30, 1999

(Under 37 CFR 1.47)

Related U.S. Application Data

(60) Provisional application No. 60/115,592, filed on Dec. 17, 1998, and provisional application No. 60/125,652, filed on Mar. 22, 1999.

(51) Int. Cl.[7] .......................... G05B 19/18; G05B 15/02; F25B 4/00
(52) U.S. Cl. .................................. 700/3; 700/9; 62/127
(58) Field of Search .............................. 700/2, 3, 9, 12; 62/126, 127, 175

(56) References Cited

U.S. PATENT DOCUMENTS

| 4,652,769 A | * | 3/1987 | Smith et al. .................. 307/31 |
| 4,819,714 A | | 4/1989 | Otsuka et al. ................. 165/12 |
| 5,065,591 A | | 11/1991 | Shaw .......................... 62/175 |
| 5,070,704 A | | 12/1991 | Conry ......................... 62/175 |
| 5,128,855 A | * | 7/1992 | Hilber et al. ................ 364/132 |
| 5,131,237 A | | 7/1992 | Valbjorn ....................... 62/175 |
| 5,301,513 A | | 4/1994 | Duff et al. .................... 62/117 |
| 5,327,742 A | | 7/1994 | Duff et al. .................... 62/175 |
| 5,460,006 A | * | 10/1995 | Torimitsu .................... 62/127 |
| 5,460,008 A | | 10/1995 | Ott et al. ...................... 62/175 |
| 5,586,444 A | | 12/1996 | Fung ........................... 62/117 |
| 5,592,824 A | | 1/1997 | Sogabe et al. ................ 62/127 |
| 5,682,329 A | * | 10/1997 | Seem et al. ............. 364/551.01 |
| 5,778,692 A | | 7/1998 | Gura ........................... 62/175 |
| 5,909,180 A | * | 6/1999 | Bailey et al. ................ 340/639 |

* cited by examiner

Primary Examiner—William Grant
Assistant Examiner—Elliot Frank
(74) Attorney, Agent, or Firm—Baker Botts L.L.P.

(57) ABSTRACT

A refrigeration control apparatus comprises a master unit with a mother board. The mother board comprises a bus configured to carry signals between boards coupled to the mother board. A processor board interfaced to the mother board is provided. The processor board comprises a processor, and a program memory where instructions for the processor are stored on the program memory. An interface circuit coupled to the mother board is provided. A load control module interfaced to the mother board is provided, wherein the load control module comprises an interface circuit coupled to the mother board, and a circuit breaker coupled to a power input. A load relay comprising a first interlocked relay and a second interlocked relay coupled to the circuit breaker is provided. The load relay is configured to switch power. An override switch and the processor coupled to the load relay to control the load relay is provided. Furthermore, an indicator coupled to the processor and the override switch is provided, wherein the line voltage being removed from the second interlocked relay when the first interlocked relay is actuated.

15 Claims, 13 Drawing Sheets

REFRIGERATION CONTROL APPARATUS AND METHOD

This application claims priority based on the provisional application entitled "Apparatus and Method for Networked Control Interface" having provisional Ser. No. 60/115,592, filed on Dec. 17, 1998, and the provisional application entitled "Apparatus and Method for Networked Control Interface" having provisional Ser. No. 60/125,652, filed on Mar. 22, 1999. The aforementioned provisional applications are hereby incorporated in their entirety by reference.

FIELD OF THE INVENTION

The invention relates generally to the field of refrigeration. More specifically, the invention relates to controllers in refrigeration systems. Even more specifically, the invention relates to consolidating, for example, the power connection, control circuit wiring, relays, circuit breakers, switches and indicators of a refrigeration controller into a single unit.

BACKGROUND OF THE INVENTION

Refrigeration systems are used in a variety of circumstances, including refrigerated cases in grocery stores, refrigerated warehouses, air conditioners and other similar systems. In one example of a refrigeration system, illustrated in FIG. 1, a rack controller 10 receives signals from sensors 12 distributed around the refrigeration system. The sensors may include temperature sensors, pressure sensors or any other kind of sensor that would be helpful in determining the refrigeration status of the area being refrigerated.

The rack controller 10 includes logic which analyzes the signals received from the sensors 12 along with information stored within the controller and determines whether, for example, the level of refrigeration should be increased or decreased or whether the system should be defrosted. The level of refrigeration being applied and the defrosting function are determined by whether or not an assortment of loads 14 and 16 have been actuated or activated. For example, the loads 14 and 16 may include compressor motors, refrigeration valves and defrost elements. Special switches, called contactors 18 are used to isolate the high power necessary to activate some of the loads 14, such as the compressor motors, from the rest of the system. Other loads 16 do not require such isolation. In most cases, the wiring to the loads 16 and the contactors 18 is protected by a circuit breakers (or fuses) 20. Further, power to the loads 16 and contactors 18 can be interrupted by opening switches 21.

An electronic relay board 22 controls activation of the loads 16 and the contactors 18. Typically, the electronic relayboard 22 includes one relay for every load 16 and contactor 18. The rack controller 10 controls the refrigeration system by sending commands to the electronic relay board 22 which causes one of the loads 14 and 16 to actuate or un-actuate.

The system typically includes mechanisms to allow manual control of the loads 14 and 16. For example, the system may include a set of toggle switches 24 that can be used to override the rack controller 10 and actuate or un-actuate a particular load 14 and 16. Further, the system typically includes a set of indicator lights 26, typically one or more for each load 14 and 16, which illuminate when various events or conditions concerning the loads 14 and 16 occur. For example, the system may include one light that will indicate that a load is actuated. Another light may indicate that control of the load has been overridden by actuation of one of the toggle switches.

Typically, all of the components shown in FIG. 1 are separate items that are wired and powered separately. For example, the toggle switches 24, indicators 26, and switches 21 may be on a door of a rack panel or panels separate from the electronic relay board 22. At installation, wiring between the switch/indicator rack panel and the electronic relay board 22 is installed. The circuit breakers 20 are typically installed in another panel, which is wired to the electronic relay board 22 upon installation.

SUMMARY OF THE INVENTION

The invention eliminates much of the wiring associated with a refrigeration control system by consolidating in a single module several of the functions of the control system. For example, in one embodiment, the functions of the electronic relay board, the circuit breakers, the toggle switches, the indicator lights, and the power connections for all of the circuits are consolidated into a single module.

In one aspect, the invention features a refrigeration control apparatus comprising a master unit. The master unit includes a mother board, which includes a bus configured to carry signals between boards coupled to the mother board. The master unit further includes a processor board interfaced to the mother board. The processor board comprises a processor, a program memory, and instructions for the processor stored on the program memory. An interface circuit is coupled to the mother board. A load control module is interfaced to the mother board. The load control module comprises an interface circuit coupled to the mother board. A circuit breaker is coupled to a power input. A load relay is coupled to the circuit breaker. The load relay is configured to switch power. An override switch and the processor are coupled to the load relay to control the load relay. An indicator is coupled to the processor and the override switch.

Implementations of the invention may include one or more of the following. The refrigeration control apparatus may include a slave unit coupled to the master unit. The slave unit may comprise a mother board and a load control module. The refrigeration control apparatus may further include a communications circuit coupled to the processor. The communications circuit may comprise a serial communications circuit, a network communications circuit or both. The refrigeration control apparatus may include a rack controller interfaced to the master unit through the communications circuit. The load relay may include a first interlocked relay and a second interlocked relay. Line voltage may be removed from the second interlocked relay when the first interlocked relay is actuated. The override switch may have a first position and a second position. The first interlocked relay may be actuated when the override switch is in the first position and the second interlocked relay may be actuated when the override switch is in the second position. The override switch may have a third position. The first interlocked relay and the second interlocked relay may be under the control of the processor when the override switch is in the third position. The indicator may provide a first indication when the override switch is in the first or second positions. The indicator may provide a second indication when the override switch is in the third position and the first interlocked relay is actuated. The indicator may provide a third indication when the override switch is in the third position and the second interlocked relay is actuated. The load control module may comprise a circuit interface module configured to be coupled to one or more loads. The loads may be one or more selected from the group of a coil on a refrigeration valves and a coil on a defrost contactor. The load control module may comprise a compressor module configured to be coupled to one or more loads comprising a coil on a compressor contactor.

The refrigeration control apparatus may include a fault circuit configured to detect the occurrence of a fault and report it to the processor board. The processor may be configured to illuminate a fault indicator upon the occurrence of the fault. The refrigeration control apparatus may include a fault reset switch coupled to the processor board. The processor may be configured to stop illuminating the fault indicator when the fault reset switch is activated. The refrigeration control apparatus may include a fault circuit configured to detect the occurrence of one or more of a plurality of faults and report the existence of one or more faults and the identity of the one or more faults to the processor board. The processor may be configured to report the identity of the one or more faults to a rack controller.

In general, in another aspect, the invention features a refrigeration control system comprising a rack controller, sensors coupled to the rack controller, a refrigeration control apparatus coupled to the rack controller, and one or more loads coupled to the refrigeration control apparatus.

Implementations of the invention may include one or more of the following. The coupling between the refrigeration control apparatus and the rack controller may be a network coupling or a serial communications coupling. The refrigeration control system may further comprise an electronic relay board coupled to the rack controller and one or more loads coupled to the electronic relay board. The refrigeration control system may further comprise a slave refrigeration control apparatus coupled to the refrigeration control apparatus.

In general, in another aspect, the invention features a method for controlling a plurality of loads in a refrigeration system comprising consolidating in an output control module, coupled to one or more loads via load circuits, circuit protection for the load circuits, load status indication, load control and a single power connection for the one or more loads.

Implementations of the invention may include one or more of the following. The method may include indicating, for each load, whether application of power to the load is under software control or override control. The method may further include controlling, for each load, whether the application of power to the load is under software control or override control. The method may further include interfacing the output control module to a processor interface module via a buss board. The method may further include controlling a load coupled to the output control module from the processor interface module when software control for the load is selected. The method may further include controlling the processor interface module with a multiple-processor-interface-module controller.

DESCRIPTION OF THE PREFERRED EMBODIMENTS

Figure 2:
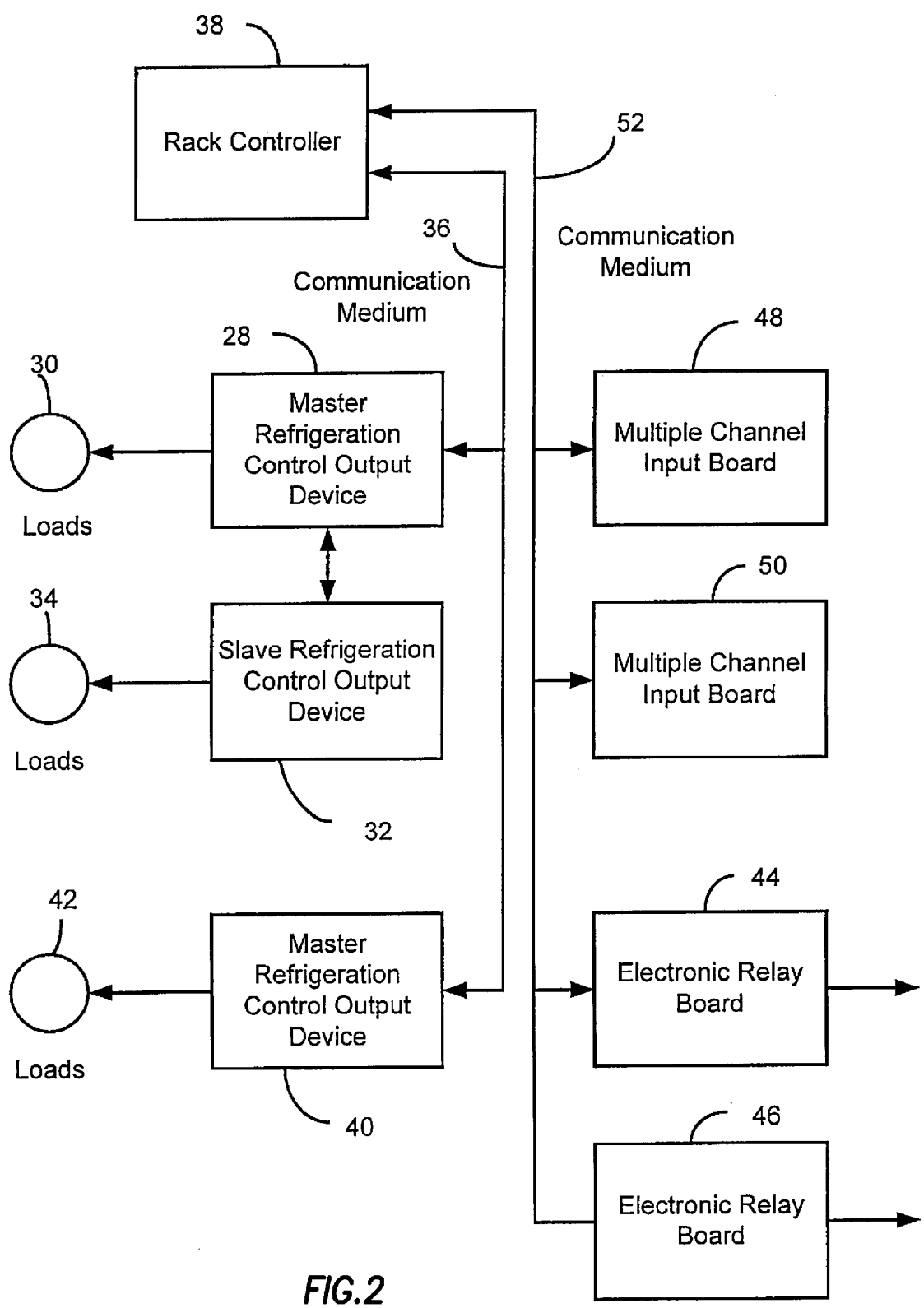
FIG. 2 is a block diagram of a refrigeration system according to the present invention.

The refrigeration system includes a master refrigeration control output device 28 which preferably incorporates the indicators, toggle switches, relays and circuit breakers necessary to control a set of loads 30, as shown in FIG. 2. Alternatively, the master refrigeration control output device may include only a subset of the indicators, toggle switches, relays and circuit breakers. The rest of the set may be located in another piece of equipment or eliminated from the system.

The system also includes a slave refrigeration control output device 32, which preferably incorporates the indicators, toggle switches, relays and circuit breakers necessary to control a set of loads 34. Alternatively, the slave refrigeration control output device may include only a subset of the indicators, toggle switches, relays and circuit breakers. The rest of the set may be located in another piece of equipment or eliminated from the system.

The master refrigeration control output device 28 communicates via a communication medium 36 with a rack controller 38. In one embodiment, the master refrigeration control output device 28 incorporates the functionality of the rack controller 38. The communication medium can be a network medium, such as that used in the ECHELON® or ETHERNET® networks or some other network. Alternatively, the communication medium can be a serial communications medium, using a serial communications protocol such as RS-485 or RS-232. The rack controller 38 monitors system sensors and applies a series of algorithms to determine which system loads should be actuated.

The rack controller sends commands to actuate or un-actuate one or more of the loads 30 and 34 over the communication medium to the master refrigeration control output device 28. The master refrigeration control output device 28 executes the commands relative to loads 30. For commands related to loads 34, the master refrigeration control output device 28 communicates with slave refrigeration control output device 32, which executes the commands. The communication between the master refrigeration control output device 28 and the slave refrigeration control output device can be accomplished in any of the communications techniques described above or preferably as described below. The master refrigeration control output device 28 communicates its status and the status of the loads 30 and 34 back to the rack controller 38.

A master refrigeration control output device 40 may be in the system without being associated with a slave refrigeration control output device, as shown in FIG. 2. The master refrigeration control output device 40 communicates with rack controller 38, as described above, and controls loads 42.

The rack controller 38 may continue to control equipment found in traditional refrigeration systems, such as electronic relay boards 44 and 46 and multiple channel input boards 48 and 50, via communication medium 52.

Figure 3:
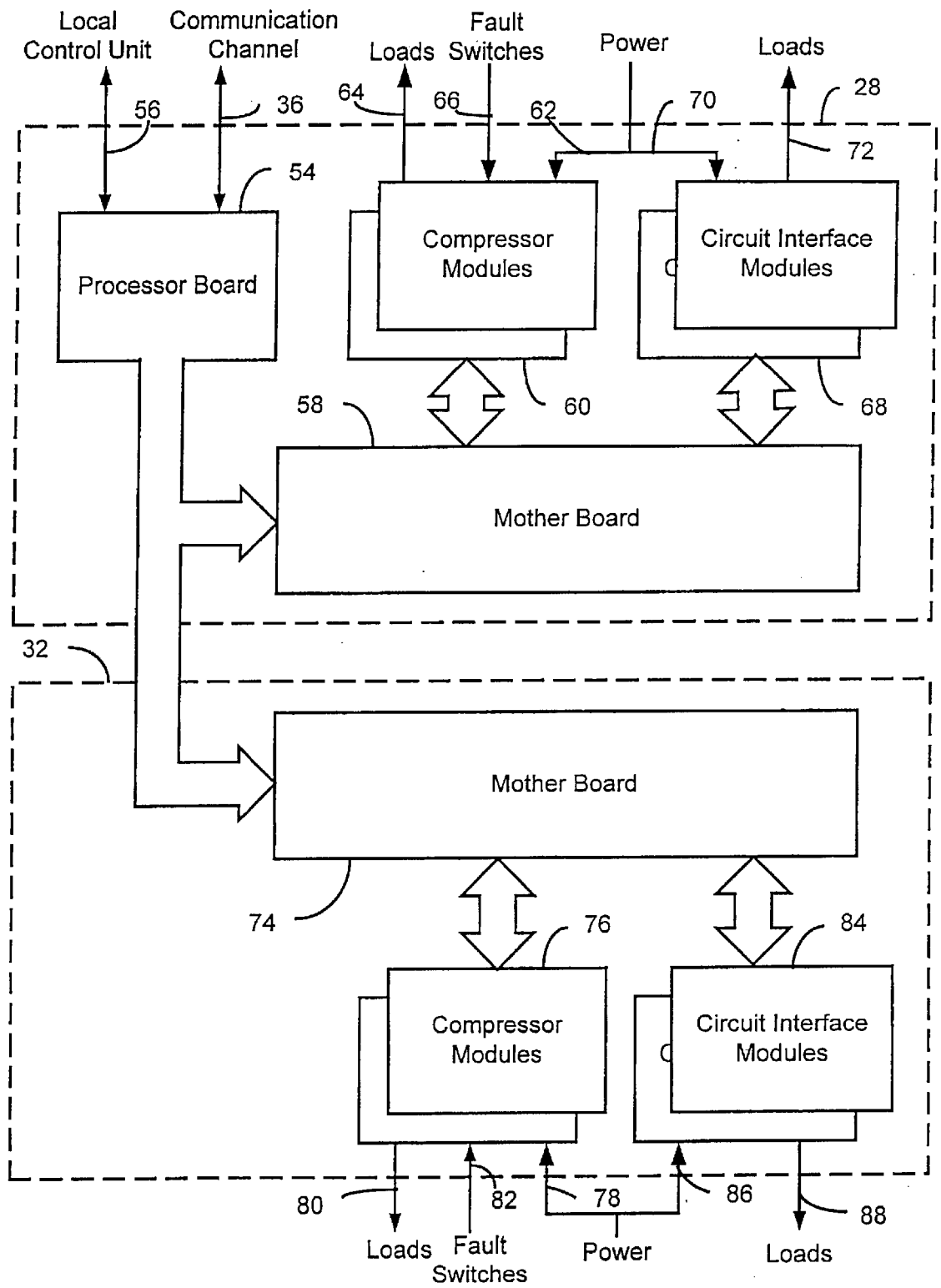
FIG. 3 is a block diagram of a master refrigeration control output device and a slave refrigeration control output device according to the present invention.

A more detailed view of the master refrigeration control output device 28 and the slave refrigeration control output device 32 is shown in FIG. 3. The master refrigeration control output device 28 includes a processor board 54 which receives commands and transmits status to the rack controller 38 via communication medium 36. The processor board 54 also allows local control of the refrigeration control output device 28 via a set of control lines 56, which can be connected to a local control unit (not shown). The processor board 54 communicates with the rest of the master refrigeration control output device 28 via the mother board 58.

The master refrigeration control output device 28 also includes one or more compressor modules 60. The compressor modules 60 receive commands from and send status to the processor board 54 via the mother board 58. The compressor modules 60 receive power via power lines 62, actuate or un-actuate loads (coils on compressor contactors) via load lines 64 and receive indications of the actuation of fault switches via fault switch lines 66.

The master refrigeration control output device 28 also includes one or more circuit interface modules 68. In the preferred embodiment, the combined number of compressor modules 60 and circuit interface modules 68 is four or less. The circuit interface modules 68 receive commands from and send status to the processor board 54 via the mother board 58. The circuit interface modules 68 receive power via power lines 70 and actuate or un-actuate loads (coils on refrigeration valves and defrost contactors) via load lines 72.

The primary difference between the master refrigeration control output device 28 and the slave refrigeration control output device 32 is the absence from the slave refrigeration control output device 32 of a processor board. The slave refrigeration control output device 32 includes a mother board 74 that communicates with the processor board 54 in the master refrigeration control output device 28. The communication can be via any method known in the art. Preferably, the communication is by way of a 6 conductor flat phone cable.

The slave refrigeration control output device 32 also includes one or more compressor modules 76. The compressor modules 76 receive commands from and send status to the processor board 54 through mother board 74 in the master refrigeration control output device 28. The compressor modules 76 receive power via power lines 78, actuate or un-actuate loads (coils on compressor contactors) via load lines 80 and receive indications of the actuation of fault switches via fault switch lines 82.

The slave refrigeration control output device 32 also includes one or more circuit interface nodules 84. In the preferred embodiment, the combined number of compressor modules 76 and circuit interface modules 84 is four or less. The circuit interface modules 84 receive commands from and send status to the processor board 54 through mother board 74 in the master refrigeration control output device 28. The circuit interface modules 84 receive power via power lines 86 and actuate or un-actuate loads (coils on refrigeration valves and defrost contactors) via load lines 88.

In use, the rack controller 38 determines the status of the refrigeration system using the sensors that are located in the system. The rack controller 38 then applies its algorithms to that status and other information it has stored to determine which loads should be actuated and which should not. The rack controller 38 communicates that information to the processor board 54 in the master refrigeration control output device 28. The processor board 54 sends commands to the compressor modules 60 and circuit interface modules 68 via the mother board 58. The compressor modules 60 and circuit interface modules 68 then actuate or un-actuate the loads they control as required by the processor board 54.

The processor board 54 through mother board 74 also sends commands to the compressor modules 76 and circuit interface modules 84 in the slave refrigeration control output device. The compressor modules 76 and circuit interface modules 84 then actuate or un-actuate the loads they control as required by the processor board 54.

Figure 1:
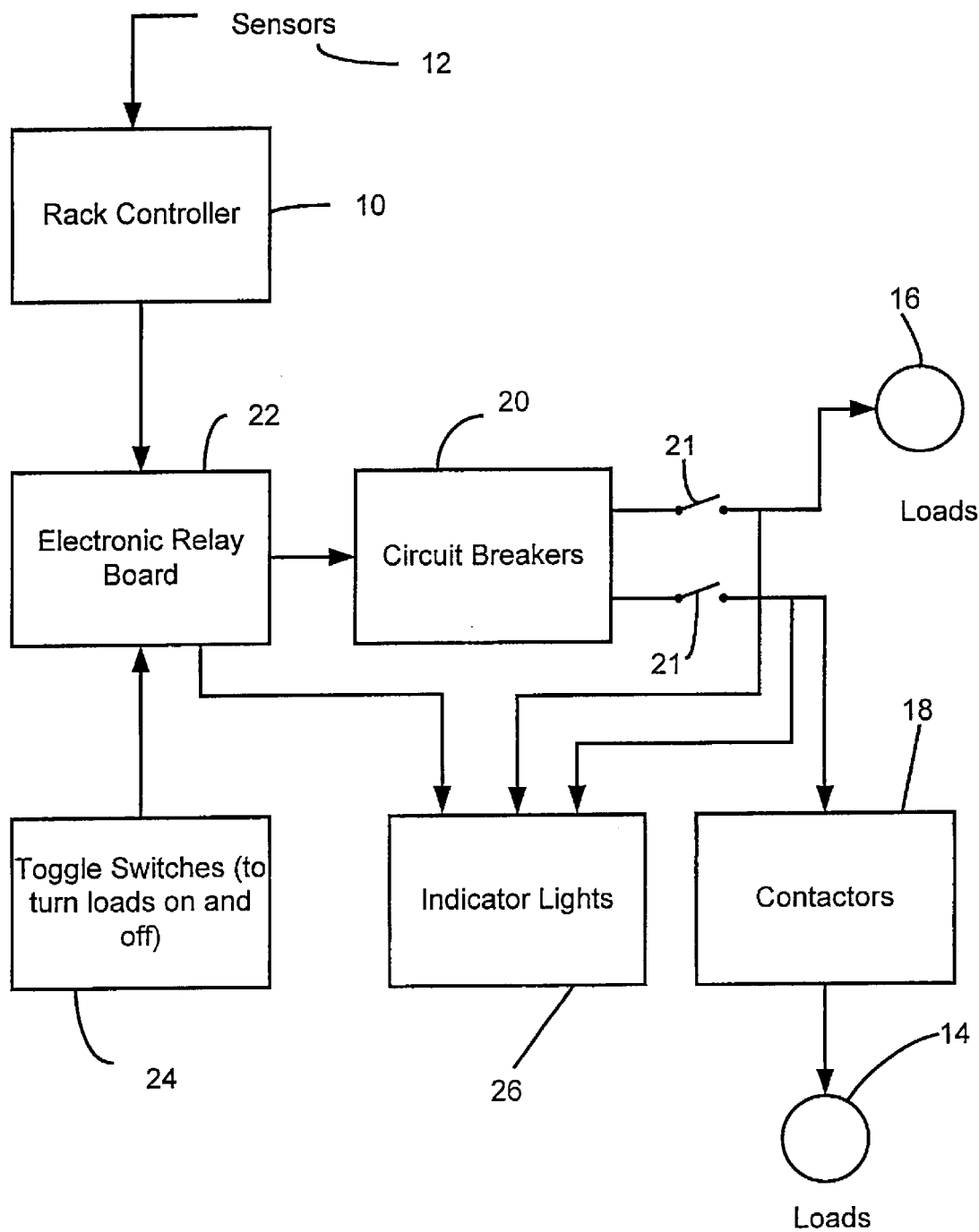
FIG. 1 is a block diagram of a prior art refrigeration system.
Figure 4:
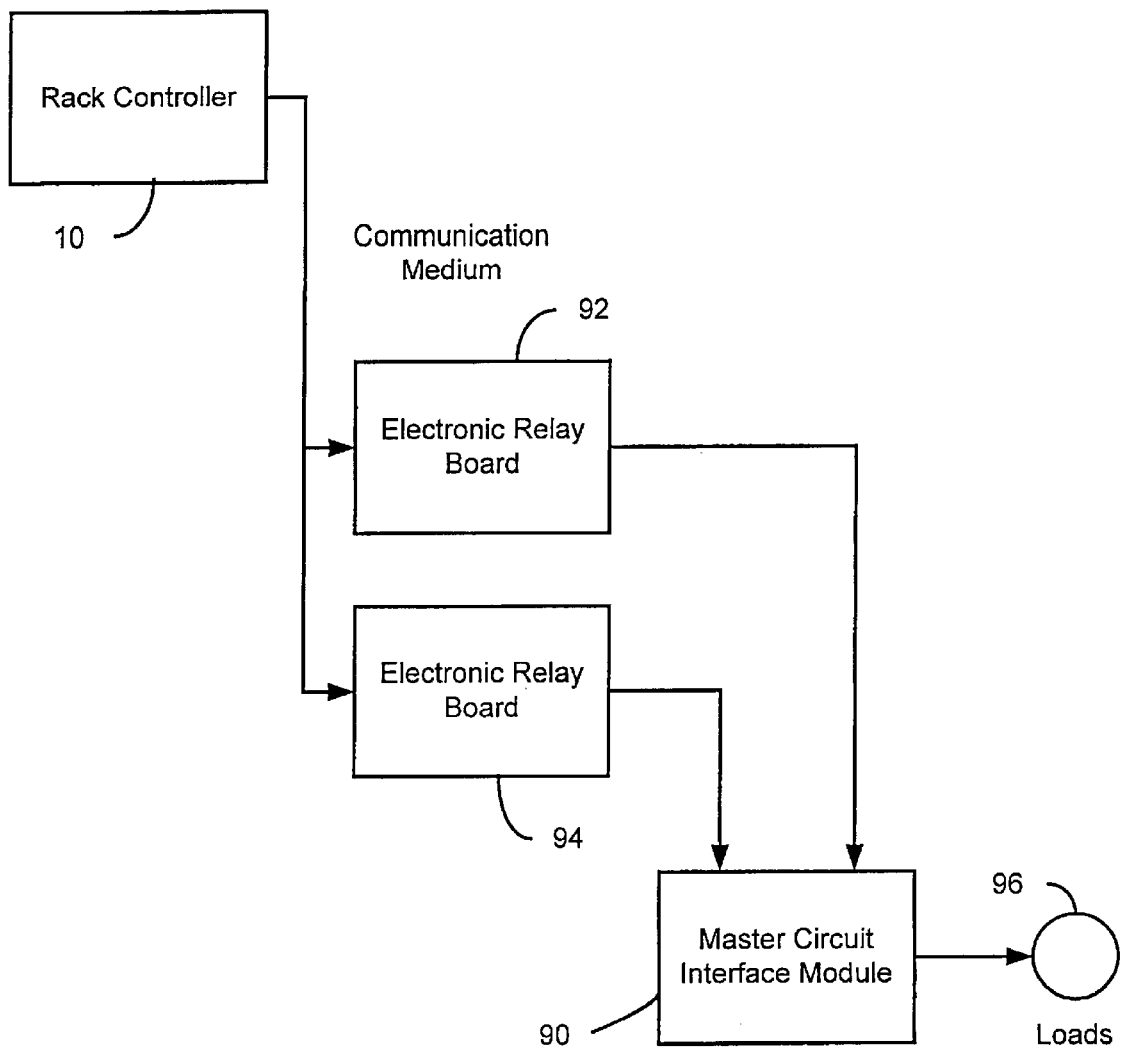
FIG. 4 is a block diagram of a refrigeration system according to the present invention.

In another embodiment, known as the "dry-contact" embodiment, a different embodiment of the master refrigeration control output device which will be referred to as a master circuit interface module 90 is interposed between the electronic relay boards 92 and 94, as illustrated in FIG. 4. The electronic relay boards 92 and 94 are still controlled by rack controller 10, as in the prior art illustrated in FIG. 1. The separate toggle switches 24, indicator lights 26 and circuit breakers 20, shown in FIG. 1, have all been eliminated from the system illustrated in FIG. 4 because they have been incorporated in the master circuit interface module 90. The master refrigeration control output device 90 controls the actuation and un-actuation of loads 96. Loads 96 include such loads as the contactors 18 and the loads 16 illustrated in FIG. 1.

Figure 5:
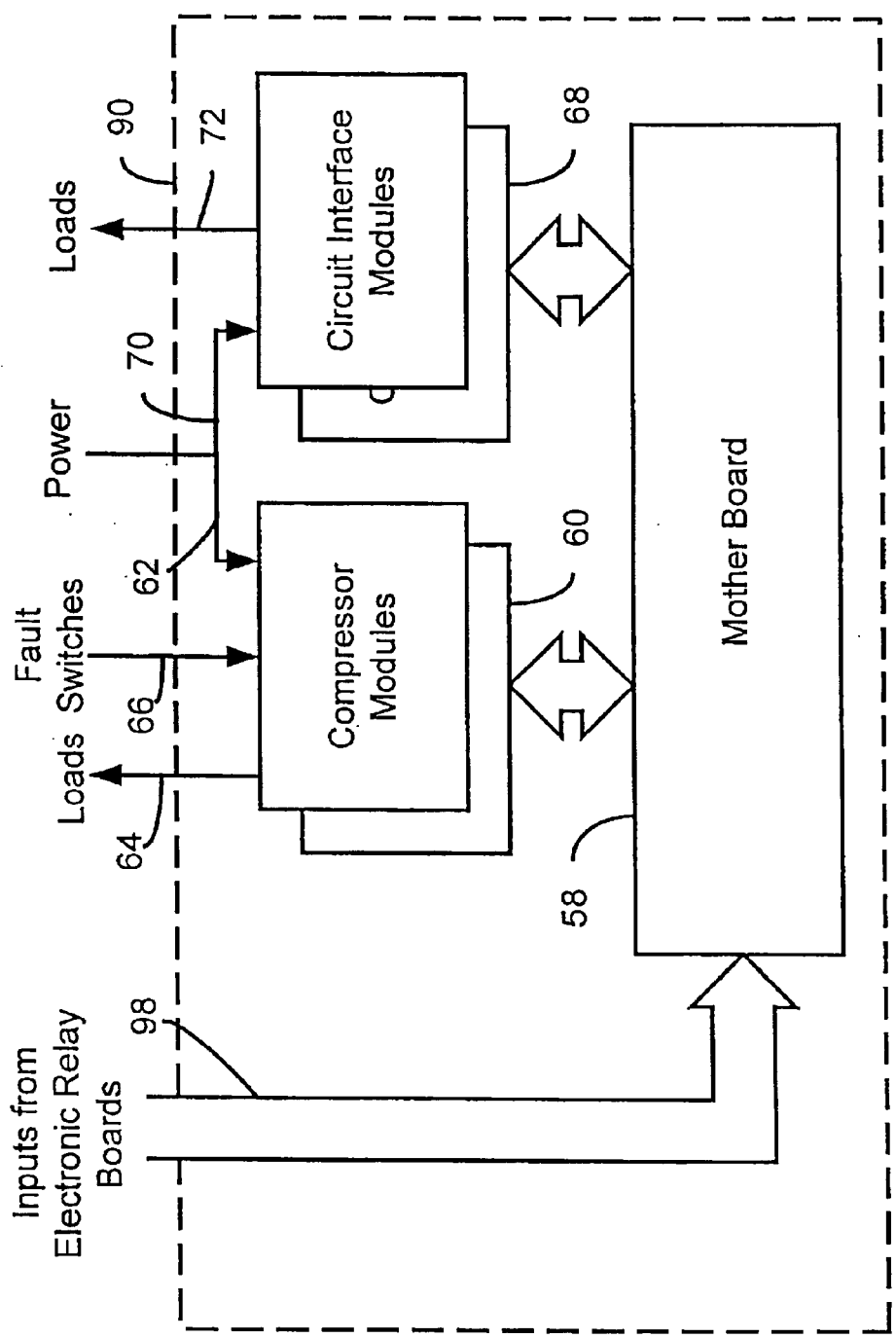
FIG. 5 is a block diagram of a master refrigeration control output device according to the present invention.

The block diagram of the master circuit interface module 90 for the dry contact embodiment, illustrated in FIG. 5, is similar to the block diagram of the master refrigeration control output device for the networked embodiment, illustrated in FIG. 3, except that the processor board 54 has been eliminated. The inputs 98 from the electronic relay boards are connected directly to the mother board 58 where they are distributed to the compressor modules and the circuit interface modules. Further, the dry contact embodiment of the master refrigeration control output device does not include a connection to allow an interface to a slave refrigeration control output device.

Chassis Assembly

Figure 6:
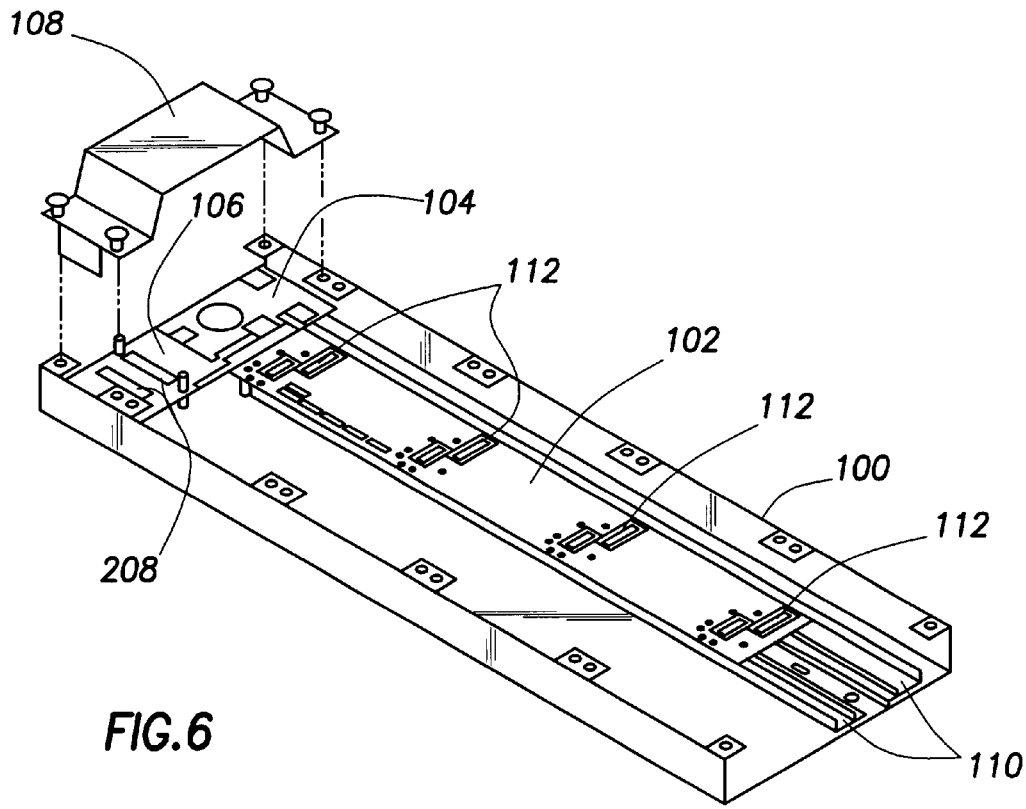
FIGS. 6, 7, 8, 9, and 11 are perspective views of portions of a master refrigeration control output device according to the present invention.
Figure 7:
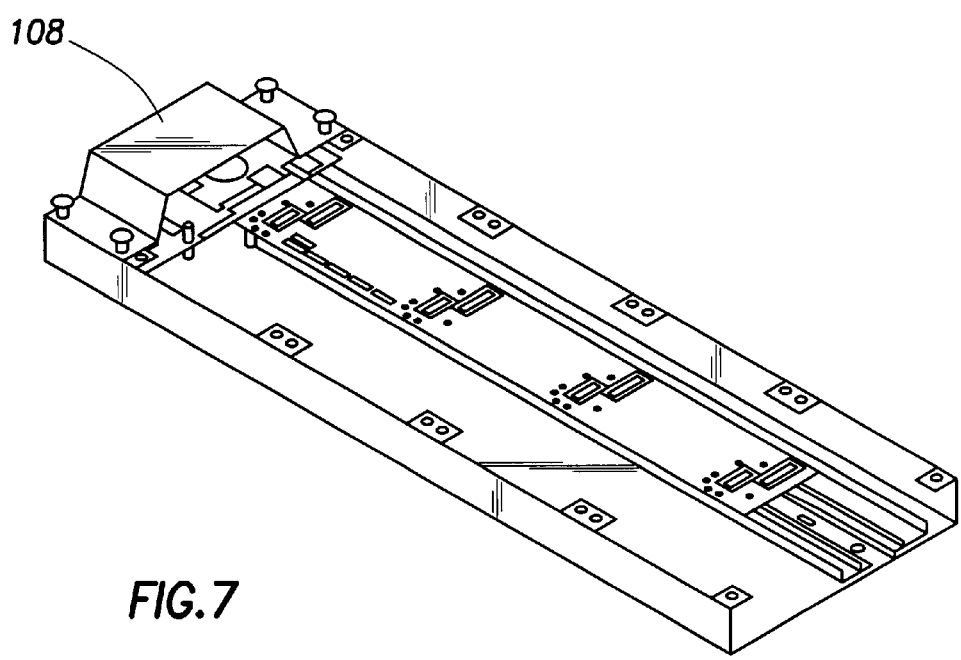

The chassis assembly includes a chassis plate 100, a mother board 102, a processor board 104, an engine/expansion board 106, and a processor board cover 108, as shown in FIGS. 6 and 7. There are four different embodiments of the chassis assembly: (1) an ECHELON® embodiment; (2) an RS-485 embodiment; (3) a dry contact embodiment; and (4) an expansion embodiment (used for the slave circuit interface module). Each of the embodiments differs in the communication capability associated with the chassis design. The details of the communications capabilities are discussed below.

Chassis Plate

The chassis plate 100 is a, preferably, aluminum back plate for mounting and supporting all of the electronics in the master or slave circuit interface module. The chassis plate can be made of any suitable material known in the art.

Mother Board

The mother board 102 has two different embodiments: (1) the engine/expansion mother board embodiment; and (2) the dry contact mother board embodiment. Each chassis assembly includes a mother board 102 mounted on a snap track 110 attached to the chassis plate 100.

The engine/expansion mother board embodiment works with the ECHELON® or RS-485 embodiments of the chassis plate 100. The dry contact mother board embodiment works with the dry contact embodiment of the chassis plate 100.

The mother board 102 provides connectors 112 for as many as, preferably, four circuit interface modules and compressor modules. The number of connectors 112 may be increased or decreased. The mother board 102 also provides connections for the processor board 104. The mother board 102 distributes communications signals between the processor board and the circuit interface modules and compressor modules.

Processor Board Cover

The processor board cover 108 is a metal covering over the processor board and engine board areas of the assembly. When installed as illustrated in FIG. 7, the processor board cover 108 helps keep the processor board and the engine board free of dirt and debris, which provides for better operating performance.

Circuit Interface Module

Figure 8:
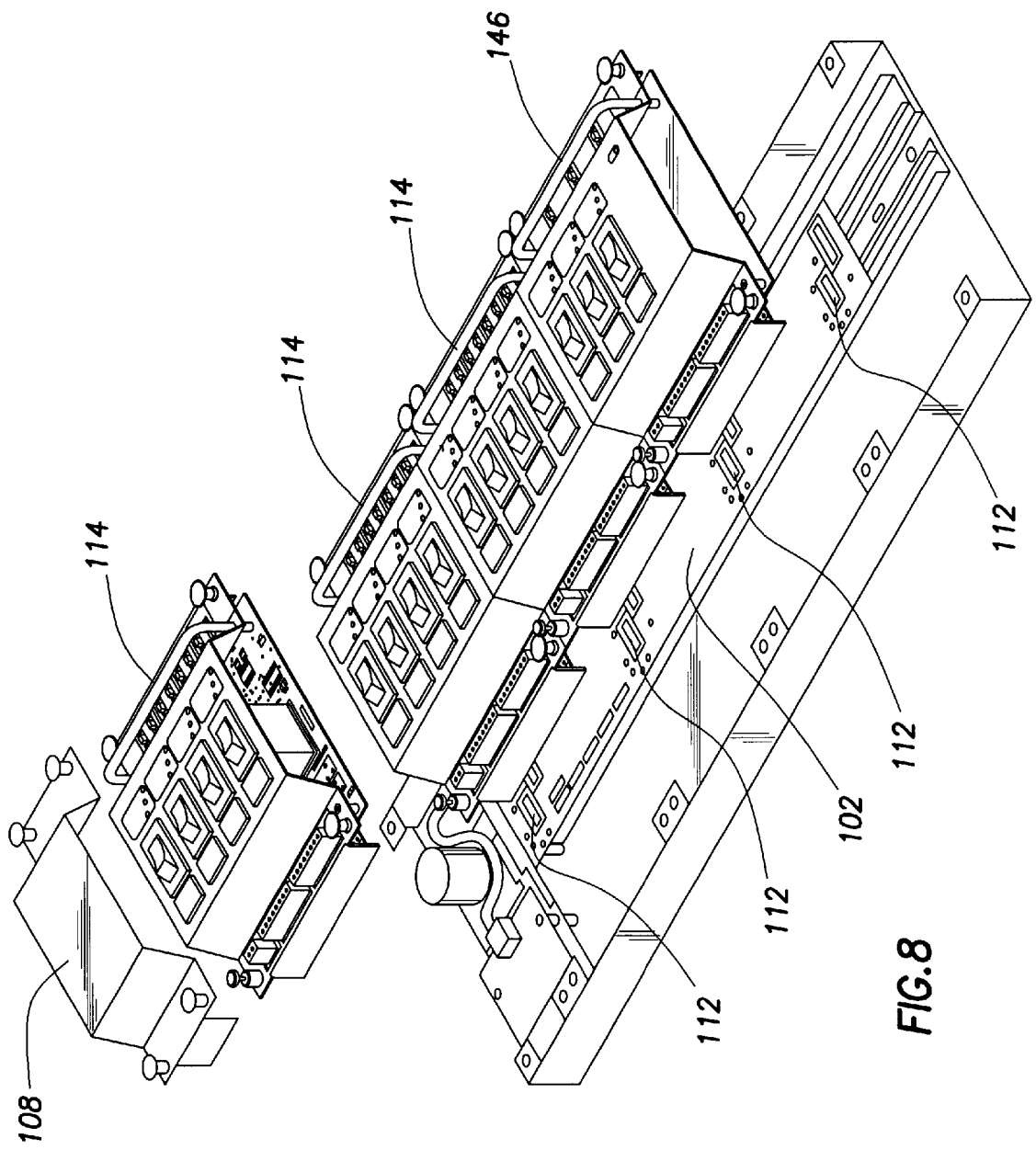

A circuit interface module 114, illustrated in FIG. 8, is the component of the system that switches the state of the control voltage to the loads. The circuit interface modules 114 connect to the mother board 102 through connectors 112. The circuit interface modules 114 control preferably four refrigeration circuits with defrost outputs per circuit interface module 114.

Figure 9:
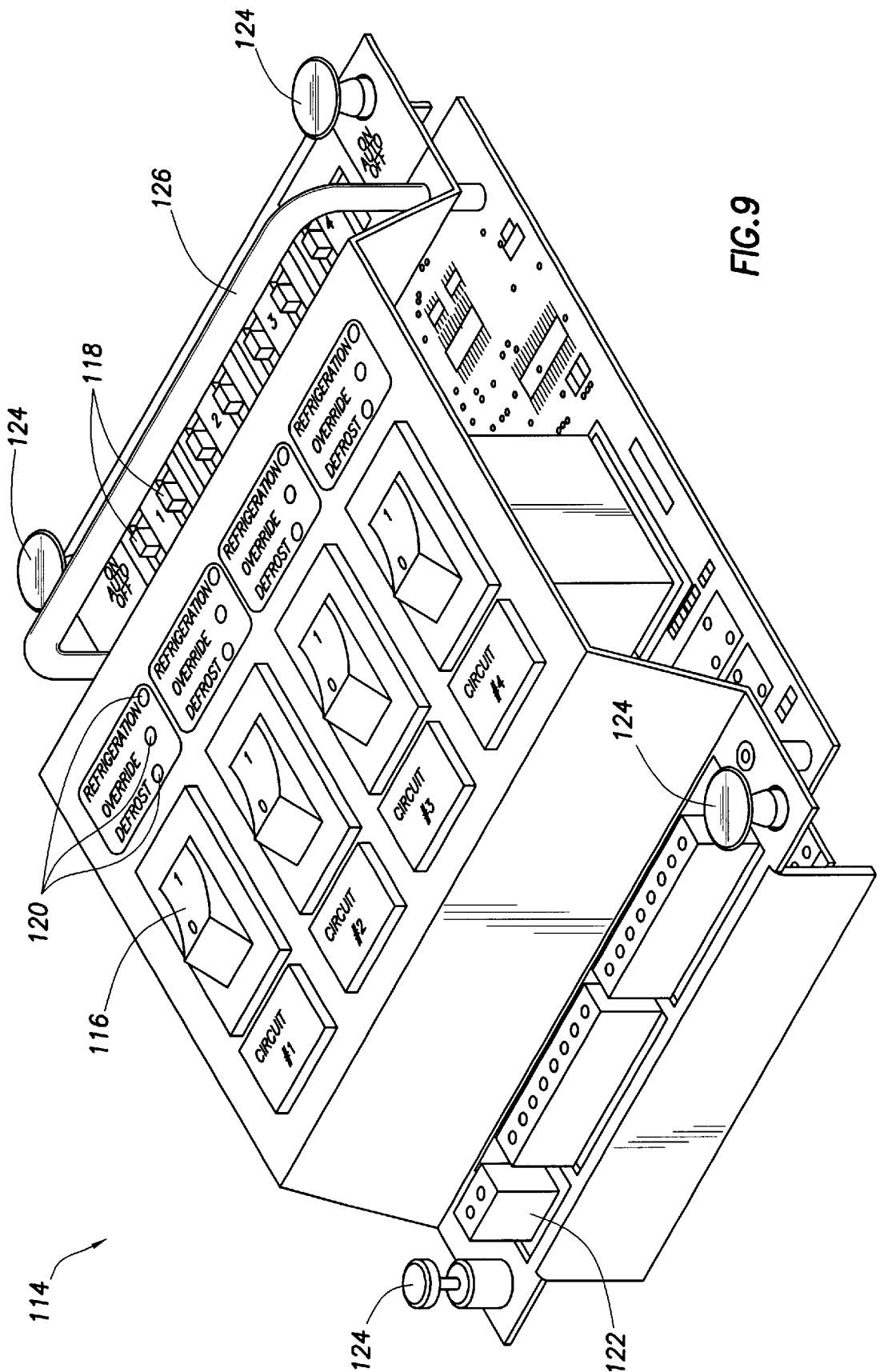

The circuit interface module 114, shown in more detail in FIG. 9, incorporates multiple functionality into one module, replacing the need to install several different components and wire them for control. The circuit interface module 114 includes the following components: (1) rocker switches 116; (2) circuit breakers (incorporated in rocker switches 116); (3) control relays (not shown); (4) override switches 118; (5) status indicators 120; and (6) a single point of connection 122 to supply power to all of the circuits connected to the module.

The circuit interface modules 114 may be removed from and installed into the chassis by unsnapping some fasteners 124 and pulling on the handle 126.

Figure 10:
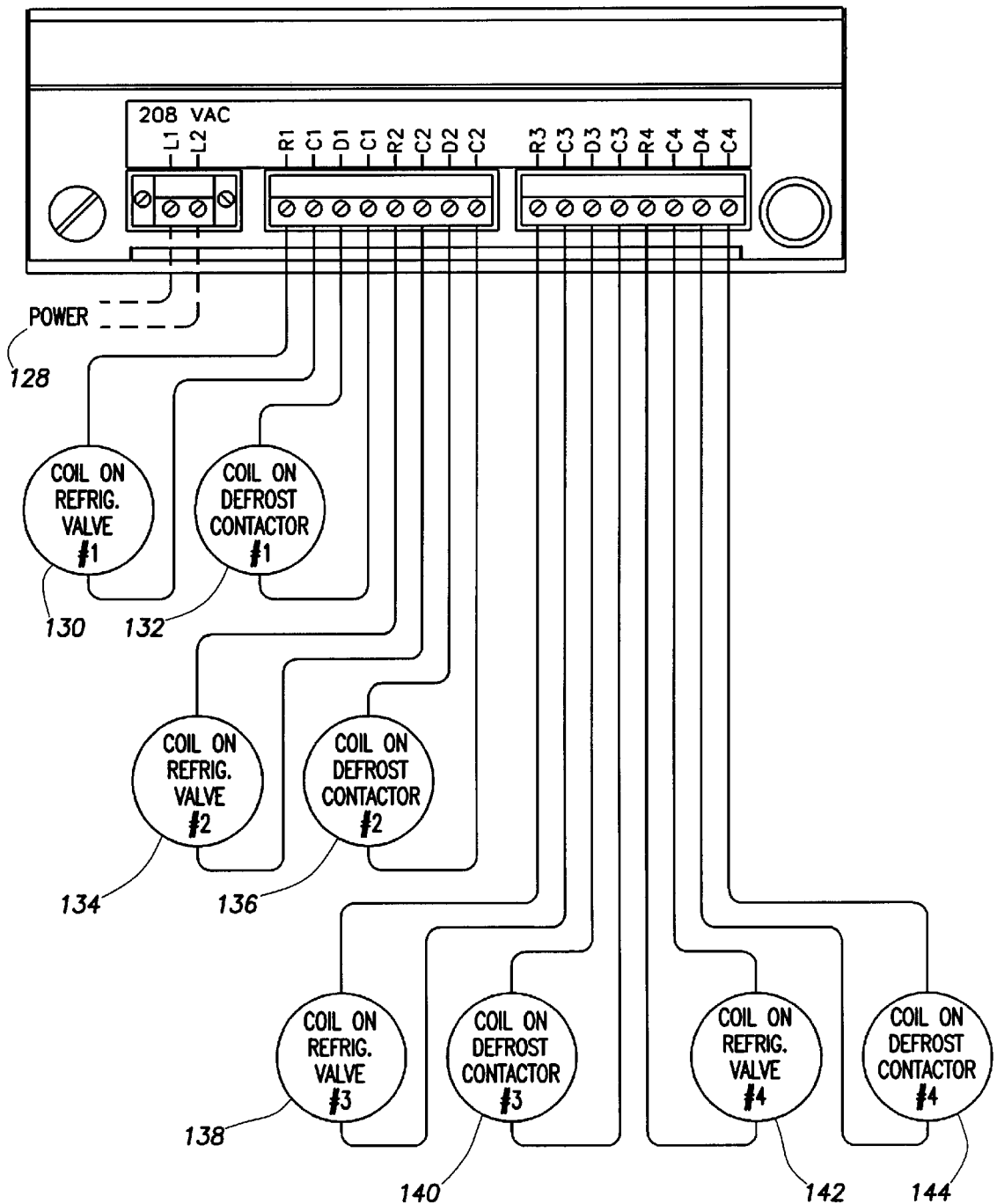
FIG. 10 is a wiring diagram for a circuit interface module according to the present invention.

Once the circuit interface modules 114 are installed in the chassis, they may be wired as shown in FIG. 10. Power 128 is connected to the L1 and L2 terminals and is supplied from there to all of the circuits connected to the module. This power is switched to various loads, using the control relays within the circuit interface modules, causing the loads to actuate when power is applied and to un-actuate when power is withdrawn.

The coil of refrigeration valve #1 130 is connected to terminals R1 and C1. These designations are abbreviations for the normally closed contact on refrigeration relay number 1 and for the associated common terminal. Similar abbreviations are used for the other relays. When relay number 1 is left un-actuated, line voltage appears across R1 and C1. This voltage is applied to the coil on refrigeration valve #1 130, causing it to actuate.

Similarly, the coil of defrost contactor #1 132 is connected to terminals D1 and C1. These designations are abbreviations for the normally open contact on defrost relay number 1 and for the associated common terminal. Similar abbreviations are used for the other defrost relays. When relay number 1 is actuated, line voltage appears across D1 and C1. This voltage is applied to the coil on defrost contactor #1 132, causing it to actuate.

The refrigeration relay number 1 and defrost relay number 1 are interlocked so that it is impossible for R1 and D1 to both have line voltage present at the same time. This prevents the refrigeration system from having its refrigeration circuits actuated at the same time as its defrost circuits. Further, in the "fail safe" mode of operation the refrigeration relay number 1 is actuated so that refrigeration is provided.

Continuing with the connections to the circuit interface module, the coil on refrigeration valve #2 134 is connected to terminals R2 and C2 and the coil on defrost contactor #2 136 is connected to terminals D2 and C2. The coil on refrigeration valve #3 138 is connected to terminals R3 and C3 and the coil on defrost contactor #3 140 is connected to terminals D3 and C3. The coil on refrigeration valve #4 142 is connected to terminals R4 and C4 and the coil on defrost contactor #4 144 is connected to terminals D4 and C4.

Referring back to FIG. 9, the operation of a circuit interface module 114 will now be described. Each of the four circuits in the circuit interface module 114 is labeled. The circuit controlling refrigeration valve #1 and defrost contactor #1 is labeled "Circuit 1"; the circuit controlling refrigeration valve #2 and defrost contactor #2 is labeled "Circuit #2"; the circuit controlling refrigeration valve #3 and defrost contactor #3 is labeled "Circuit #3"; and the circuit controlling refrigeration valve #4 and defrost contactor #4 is labeled "Circuit #4".

Each circuit has associated with it a rocker switch 116, two override switches 118 and three indicators 120. The rocker switch 116 provides a mechanism to interrupt control power. If the rocker switch 116 is in the "up" position (the position shown in FIG. 9), it is closed allowing the control to operate. In that position, the rocker switch 116 is illuminated. Placing the rocker switch 116 in the "down" position will interrupt power to the circuit control. Each rocker switch 116 also includes a circuit breaker so that if the amount of current drawn through the rocker switch 116 exceeds a specified amount, the circuit breaker "trips", interrupting power to the circuit.

Each circuit includes two override switches 118. One of the override switches 118, labeled "R", allows an override of the refrigeration relay and the other, labeled "D", allows an override of the defrost relay.

The override switches 118 provide three selectable positions. Placing an override switch 118 in the "ON" position overrides the load to the on condition. Placing an override switch 118 in the "AUTO" position leaves the load in software control. "AUTO" is the default position of each override switch 118. Placing an override switch 118 in the "OFF" position overrides the load to the off condition.

The override switches will not override the refrigeration/defrost interlock which prevents the refrigeration load from being actuated at the same time as the defrost load. Therefore, to override defrost to the "ON" position, the refrigeration override switch is set to "OFF" prior to switching the defrost override switch to "ON". Similarly, to override refrigeration to the "ON" position, the defrost override switch is set to "OFF" prior to switching the refrigeration override switch to "ON".

The circuit control module 114 includes three LED indicators: (1) a green "refrigeration" LED; (2) a red "override" LED; and (3) a yellow "defrost" LED. When the red LED blinks continuously it indicates that the circuit is in override. When the green LED is illuminated, it indicates that the circuit is in refrigeration control. When the yellow LED is illuminated, it indicates that the circuit is in defrost control.

If the circuit interface module does not receive any communications from the processor board for two minutes it enters a fail-safe mode in which all refrigeration valves connected to the circuit interface module are turned on. The circuit interface module exits the fail-safe mode as soon as communications with the processor board are restored.

Compressor Module

Referring back to FIG. 8, a compressor module 146 is coupled to the mother board 102 through one of the connectors 112. The compressor module 146 controls preferably four compressor circuits (the Figure shows only three). The number of compressor circuits controlled can be increased.

Figure 11:
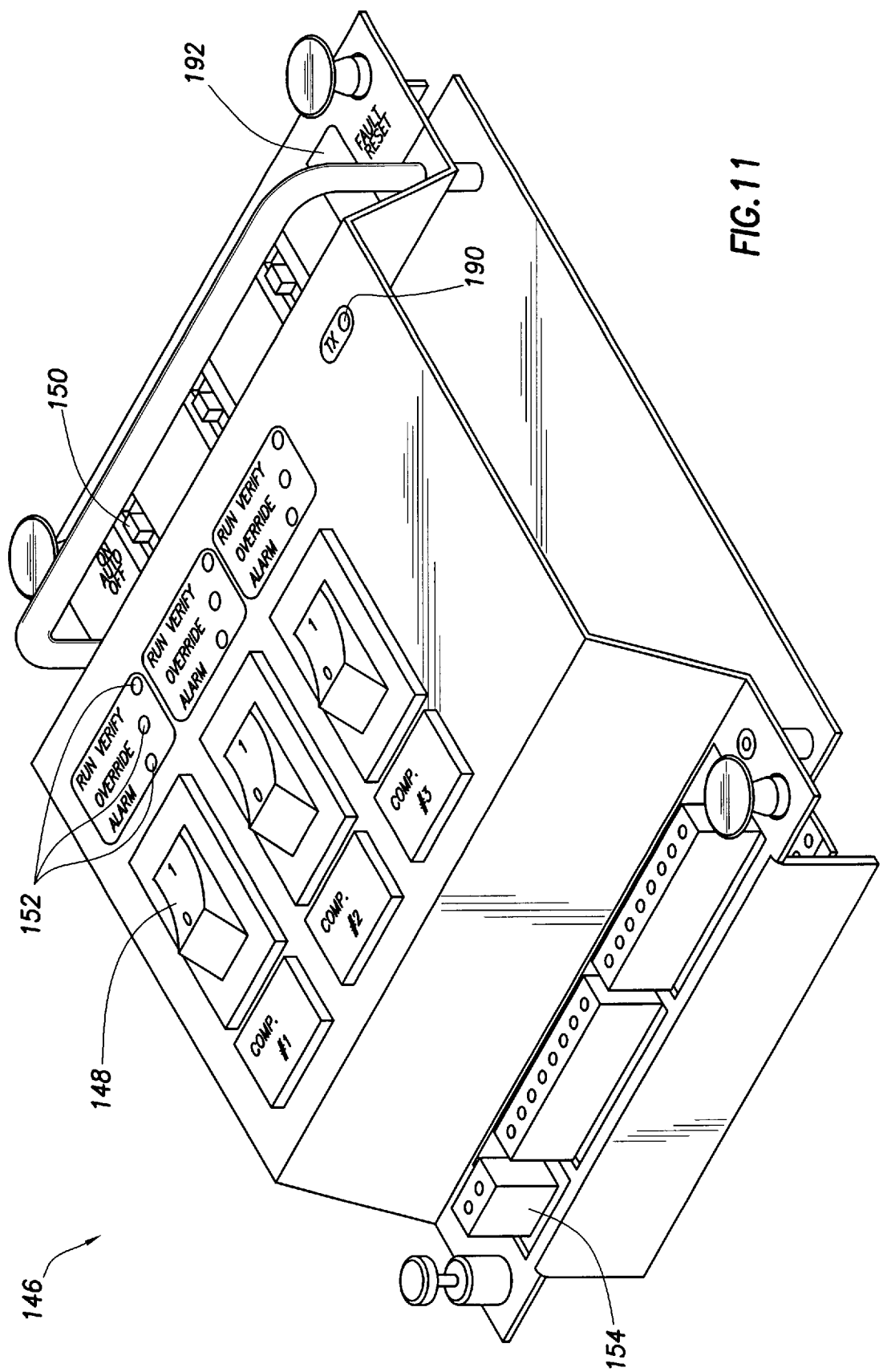

Like the circuit interface module 114, the compressor module 146, shown in more detail in FIG. 11, incorporates multiple functionality into one module, replacing the need to install several different components and wire them for control. The compressor module 114 includes the following components: (1) rocker switches 148; (2) circuit breakers (incorporated in rocker switches 148); (3) control relays (not shown); (4) override switches 150; (5) status indicators 152; and (6) a single point of connection 154 to supply power to all of the circuits connected to the module. Like the circuit interface module 114, the compressor module 146 is divided into circuits, shown in FIG. 11 labeled as Comp. #1, Comp. #2, and Comp. #3.

Figure 12:
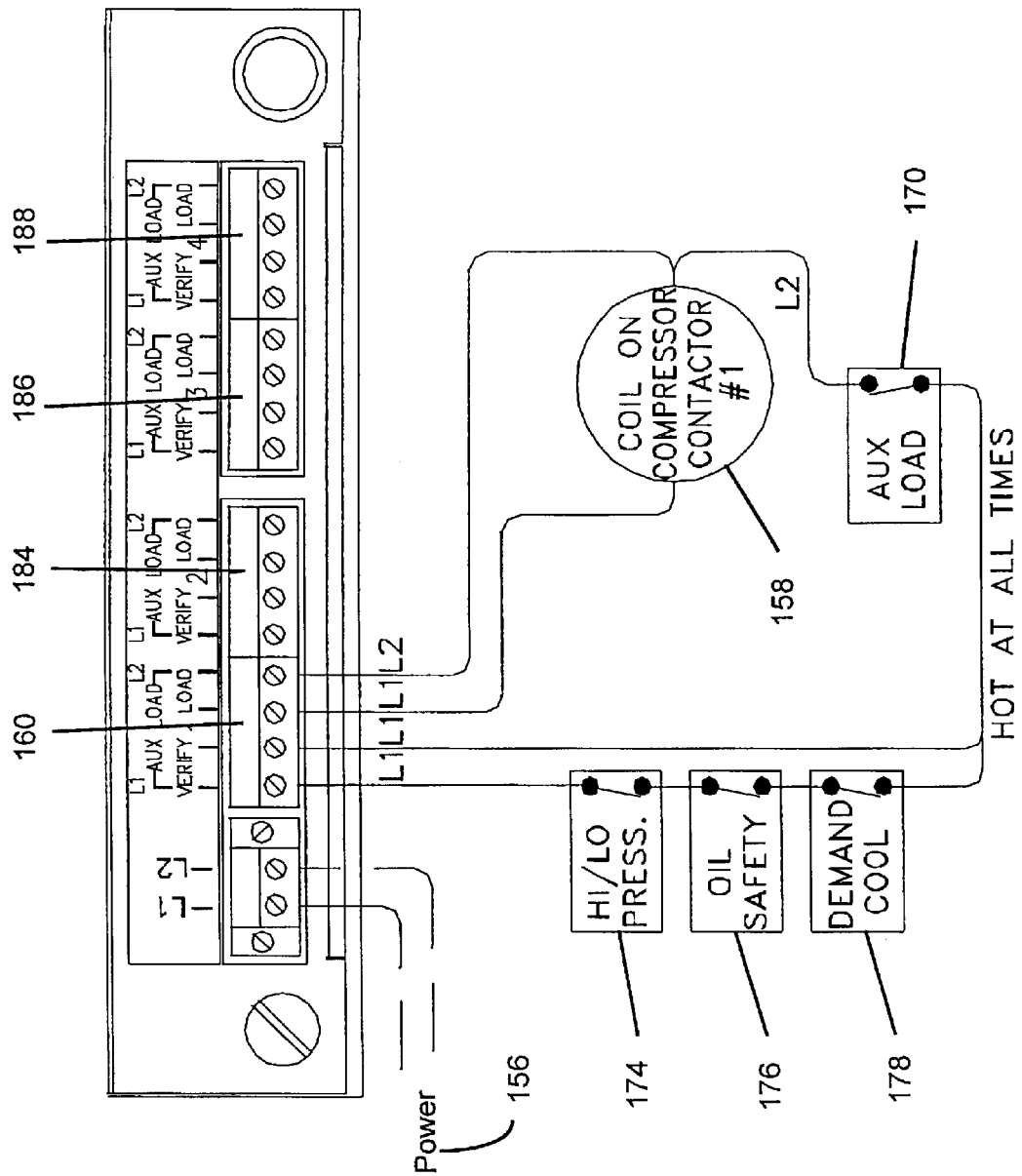
FIG. 12 is a wiring diagram for a compressor module according to the present invention.

Once the compressor modules 146 are installed in the chassis, they may be wired as shown in FIG. 12. Note that FIG. 12 shows the wiring for a compressor module capable of controlling four compressors. Power 156 is connected to the L1 and L2 terminals and is supplied from there to all of the circuits connected to the module. This power is switched to various coils on compressor contactors, causing respective contactors to actuate, which in turn actuates a compressor.

The coil on compressor contactor #1 158 is wired to the "LOAD" terminals on one of the terminal blocks 160. This is further illustrated in FIG. 13, which is divided into two parts by a dashed line. The portion of the drawing above the dashed line is inside the compressor module 146 while the portion below the dashed line is outside. As can be seen, the coil on the compressor contactor #1 158 is connected to terminals 162 and 164. If circuit breaker 166, which breaks both sides of the line, has not tripped and load switch 168 is in the closed position, power will be applied to coil 158. As can be seen, actuation of the coil on compressor contractor #1 158 can be controlled by controlling the position of the switch 168.

Figure 13:
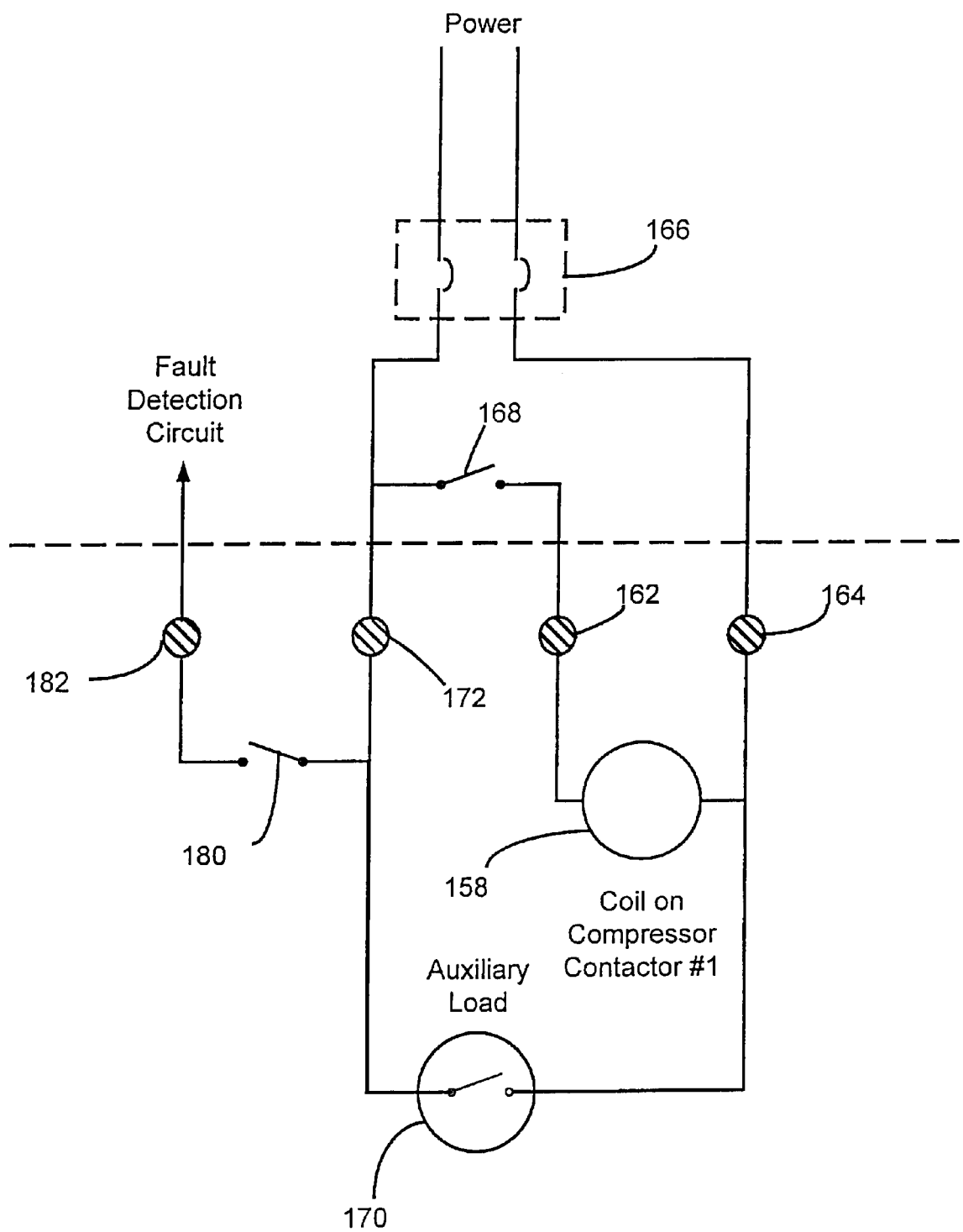
FIG. 13 is a wiring diagram for a compressor module showing some of the functionality of the compressor module according to the present invention.

Referring back to FIG. 12, an auxiliary load 170 is connected from one of the compressor terminals to another line terminal. This is illustrated in FIG. 13, which shows that the auxiliary load 170 is connected across the terminals 172 and 164. This means that the load switch 168 does not switch the circuit to the auxiliary load 170. Therefore, as long as circuit breaker 166 has not tripped, power will be supplied to the auxiliary load 170.

A series of fault switches, configured to indicate faults in the refrigeration system, may also be connected to the terminal strip 160. The switches are connected at one end to a switch in the auxiliary load and at the other end to a terminal on the terminal strip so that if all of the switches are closed, power is present at the terminal. If one of the switches opens because of a fault, power will no longer be present at the terminal. The switches include, but are not limited to a HI/LO pressure switch 174, an oil safety switch 176, and a demand cool switch 178., as shown in FIG. 12. An auxiliary switch in the compressor that closes when the compressor is running (not shown) can also be included in the loop. Alternatively, each of the fault switches may have its own connection to the terminal switch so that the compressor module can detect which fault occurred.

The wiring of the fault switches (represented by a single switch 180) is illustrated in FIG. 13. One side of the switch 180 is wired to the switch in the auxiliary load. The other side of the switch 180 is wired to terminal 182, which is connected to fault detection circuitry within the compressor module 146. When there are no faults, switch 180 will be closed and a line voltage will appear at the terminal 182 connected to the fault detection circuitry. When a fault occurs, switch 180 opens and the line voltage at terminal 182 disappears. The fault detection circuitry detects the disappearance and reports the fault, as is described below.

Referring back to FIG. 12, the other terminal strips 184, 186 and 188 are wired similarly (not shown).

In use, the compressor module's rocker switch 148, shown in FIG. 11, is a power switch that includes the circuit breaker 166, shown in FIG. 13. When the rocker switch 148 is in the "up" position shown in FIG. 11, the rocker switch 148 is illuminated and power is available to be applied to the coil on the compressor contactor if the load switch 168 (FIG. 13) is closed. When the rocker switch 148 is in the "down" position or if the circuit breaker 166 trips, power is interrupted and is no longer available to be applied to the coil on the compressor contactor.

The compressor module includes a three-position manual override switch 150. When the switch 150 is in the "auto" position, the associated compressor (compressor #1 in this case) is under software control. When the switch 150 is in the "on" position, the compressor is in override in the "on" condition. When the switch 150 is in the "off" position, the compressor is in override in the "off" condition.

The compressor module includes three indicator LEDs 152, as shown in FIG. 11. The "Run Verify" LED is green and illuminates when the associated compressor (compressor #1 in this case) is requested to run. The "TX" LED 190 is illuminated when the compressor module transmits serial data.

The "Alarm" LED is illuminated when a fault switch (i.e. 174, 176, 178 in FIG. 12) is open. The "Alarm" LED will blink on and off at about a 1 Hertz rate if a fault occurs but is no longer present (indicating an intermittent problem). The blinking "Alarm" LED is cleared by pressing the fault reset switch 192. The presence of a fault is determined by the absence of line power on terminal 182. The "Alarm" LED is illuminated if the line power on terminal 182 is not present for X seconds after the load switch 168 is initially ordered to close, turning the compressor on. X is preferably selectable between 180 and 15 seconds. Alternatively, X is 180 seconds. The "Alarm" LED is also illuminated if the line voltage is present on fault terminal 182 more than 15 seconds after load switch 168 is ordered to open, turning the compressor off.

Actual compressor control is commanded by the processor board through the mother board. When the processor board receives a command from a rack controller to activate a compressor, it sends a command to the compressor module, which closes its load relay.

When power to the compressor control is off, the load relay is in a position so that when power is restored the compressor will run. When power is applied to the compressor module, the load relay remains in that position and does not chatter. The load relay remains in its initial position for 15 seconds after power is turned on.

If the compressor module does not receive any communications from the processor board for two minutes it enters a fail-safe mode in which all compressors connected to the compressor module are turned on. The compressor module exits the fail-safe mode as soon as communications with the processor board are restored.

Processor Board

The processor board 54 communicates with the rack controller 38. The processor board 54 receives commands to turn load switches on or off and reports override status back to the rack controller 38. In addition, the processor board 54 reports to the rack controller 38 which safety override shut down a particular compressor in the instances in which this information is available from the compressor module.

There are two embodiments of the processor board: one that communicates with the rack controller 38 via RS-485 and the other that communicates via ECHELON®. An alternative processor board communicates via both protocols.

Figure 14:
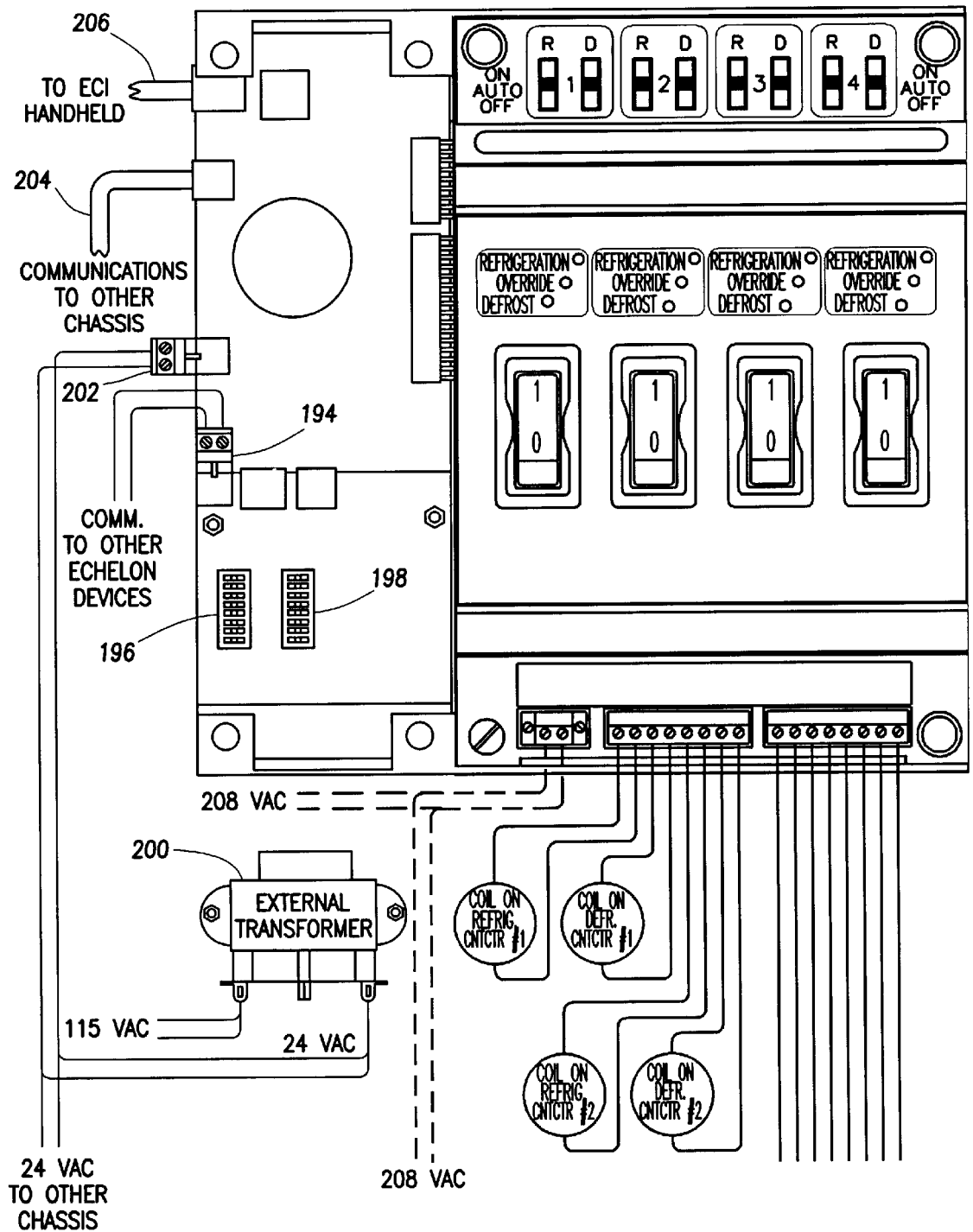
FIG. 14 is a wiring diagram for a processor board according to the present invention.

The ECHELON® embodiment of the processor board, illustrated in FIG. 14, includes a connector 194 to terminate the ECHELON® network. It also includes two dip switches 196 and 198, which are used to configure the processor board for ECHELON® addressing.

ECHELON® uses a tiered address protocol to recognize different devices on the network. The "subnet address" is a higher level address. There are 255 subnet address identifiers on a single ECHELON® domain within the network. The "node address" is a lower level address contained and identified within each subnet address. There are 127 node address identifiers assignable within a single subnet address. The rack controller 38 addresses the processor board by checking for the subnet address and then the node address within the ECHELON® network.

Dip switches 196 and 198 are used to define the ECHELON® address for the processor board. Dip switch 196 contains 8 switches, numbered 1 through 8, which are used to set the subnet address. Each of the 8 switches has an "on" position and an "off" position. The subnet address can be set either through use of dip switch 196 or, if all of the switches on dip switch 196 are set to "off", by software control.

Dip switch 198 also contains 8 switches numbered 1 through 8. Each of the 8 switches has an "on" position and an "off" position. Switches 1 through 3 are used to set the node address of the processor board on the ECHELON® network. If all of switches 1 through 3 are set to "off" the node address is set by software control.

Switches 4 through 8 on dip switch 198 are used to reference the number of relays per board as assigned in the rack controller 38. Each manufacturer of rack controllers may use a different software format for assigning boards and relay number per board. The use of dip switches 4 through 8 allows the processor board to support these different formats.

The processor board accepts power from a 24 VAC external transformer 200 through connector 202. The processor board can communicate with a slave refrigeration control output device through cable 204. The processor board receives commands from and sends status to a hand-held remote control via cable 206.

A dry contact embodiment of the processor board that interfaces with one or more electronic relay boards is illustrated in FIG. 6. Connectors 208 allow communication between the electronic relay boards and the processor boards.

The foregoing describes preferred embodiments of the invention and is given by way of example only. The invention is not limited to any of the specific features described herein, but includes all variations thereof within the scope of the appended claims.

What is claimed is:

1. An arrangement within a refrigeration control apparatus comprising
   a master unit comprising
      a mother board comprising
         a bus configured to carry signals between boards coupled to the mother board;
         a processor board interfaced to the mother board, the processor board comprising
            a processor;
            a program memory;
            instructions for the processor stored on the program memory;
            an interface circuit coupled to the mother board;
         a load control module interfaced to the mother board, the load control module comprising
            an interface circuit coupled to the mother board;
            a circuit breaker coupled to a power input;
            a load relay comprising a first interlocked relay and a second interlocked relay coupled to the circuit breaker, the load relay configured to switch power;
            an override switch and the processor coupled to the load relay to control the load relay; and
            an indicator coupled to the processor and the override switch; wherein line voltage being removed from the second interlocked relay when the first interlocked relay is actuated.

2. The arrangement of claim 1 further comprising
   a slave unit coupled to the master unit comprising
      a mother board; and
      a load control module.

3. The arrangement of claim 1 further comprising
   a communications circuit coupled to the processor.

4. The arrangement of claim 3 wherein
   the communications circuit comprises a serial communications circuit.

5. The arrangement of claim 3 wherein
   the communications circuit comprises a network communications circuit.

6. The arrangement of claim 3 wherein
   the communications circuit comprises a serial communications circuit and a network communications circuit.

7. The arrangement of claim 3 further comprising
   a rack controller interfaced to the master unit through the communications circuit.

8. The arrangement of claim 1 wherein
   the override switch has a first position and a second position;
   the first interlocked relay being actuated when the override switch is in the first position; and
   the second interlocked relay being actuated when the override switch is in the second position.

9. The arrangement of claim 1 wherein
   the override switch has a third position;
   the first interlocked relay and the second interlocked relay being under the control of the processor when the override switch is in the third position.

10. The arrangement of claim 1 wherein
    the indicator provides a first indication when the override switch is in the first or second positions;
    the indicator provides a second indication when the override switch is in the third position and the first interlocked relay is actuated; and
    the indicator provides a third indication when the override switch is in the third position and the second interlocked relay is actuated.

11. The arrangement of claim 1 wherein
    the load control module comprises a circuit interface module configured to be coupled to one or more loads comprising one or more selected from the group consisting of a coil on a refrigeration valves and a coil on a defrost contactor.

12. The arrangement of claim 1 wherein
    the load control module comprises a compressor module configured to be coupled to one or more loads comprising a coil on a compressor contactor.

13. The arrangement of claim 1 further comprising a fault circuit configured to detect the occurrence of a fault and report it to the processor board;

the processor configured to illuminate a fault indicator upon the occurrence of the fault.

14. The arrangement of claim 13 further comprising a fault reset switch coupled to the processor board; and the processor board being configured to stop illuminating the fault indicator when the fault reset switch is activated.

15. The arrangement of claim 1 further comprising a fault circuit configured to detect the occurrence of one or more of a plurality of faults and report the existence of one or more faults and the identity of the one or more faults to the processor board;

the processor configured to report the identity of the one or more faults to a rack controller.

* * * * *